United States Patent [19]

Kamijo

[11] Patent Number: 4,853,822
[45] Date of Patent: Aug. 1, 1989

[54] CIRCUIT BREAKER
[75] Inventor: Kenichi Kamijo, Matsumoto, Japan
[73] Assignee: Izumi Seimitsu Kogyo Kabushiki Kaisha, Matsumoto, Japan
[21] Appl. No.: 114,161
[22] Filed: Oct. 27, 1987
[30] Foreign Application Priority Data Mar. 13, 1987 [JP] Japan ................... 62-058093

[51] Int. Cl.⁴ ............................. H02H 3/16
[52] U.S. Cl. .................. 361/100; 361/104; 337/156
[58] Field of Search ............... 361/42, 48–50, 361/103, 104, 115, 178, 100, 101; 307/116, 118, 326; 340/604, 605, 650; 337/156, 157, 190

[56] References Cited
U.S. PATENT DOCUMENTS 4,589,047 5/1986 Gaus et al. ................. 361/42
4,751,603 7/1988 Kwan ....................... 361/50

Primary Examiner—L. T. Hix
Assistant Examiner—David M. Gray
Attorney, Agent, or Firm—Jordan and Hamburg

[57] ABSTRACT

A circuit breaker for an electric device has a pair of switching pieces, an electric circuit for supplying electric power to the device, an arrangement for opening the electric circuit, an arrangement for locking the switching pieces to normally close the electric circuit, a drive connected in parallel with the power source via a gate for releasing the locking arrangement, and a terminal piece located in the device and connected to the electric circuit by a cord. The cord picks up leakage current in the device to turn the gate on by the leakage current when the device becomes immersed in water. The turning on of the gate effects the release of the locking arrangement, so that the switching pieces open the electric circuit.

3 Claims, 5 Drawing Sheets 4,853,822

CIRCUIT BREAKER

FIELD OF THE INVENTION AND RELATED ART STATEMENT

This invention relates to a circuit breaker, in particular to a circuit breaker which opens the electric circuit when the electric device proper has been immersed water, for preventing an electric shock.

Conventionally, electric devices, especially portions including electric circuit, are usually used away from the water for preventing an electric shock because water has current-conductivity so leakage my occur from the non-insulated portions of the electric device proper.

For dampproofing, filling a gap with proper materials will suffice but, in case of dropping the device into water, this is almost ineffective. Furthermore, there are electric devices which are required to have an opening section, e.g. a hair dryer. For example, in case of dropping the hair dryer while using it in the water in the bathroom, it is very dangerous to pick it up by hand from the water without pulling the plug of the hair dryer from an outlet because of the danger of an electric shock.

A means to solve the problem has been desired.

OBJECT AND SUMMARY OF THE INVENTION

The object of this invention is to provide a circuit breaker which is able to prevent an electric shock by opening electric circuit automatically upon immersion of the electric device proper.

In a circuit breaker of this invention, which is connected between an electric device proper and a power source via an extension cord and which is able to prevent an electric shock, the circuit breaker comprises switching pieces provided in the electric circuit connected to the electric device proper, means for opening the electric circuit, means for locking the switching pieces to normally close the electric circuit, a drive which is connected to the power source via a gate and releases the means for locking, and a terminal piece located in the electric device proper and connected to the electric circuit by an extension cord, which picks leakage current up to turn the gate on by the leakage current when the electric device proper has been immersed in the water. Since the circuit breaker of this invention has above described structure, even if the electric device proper passing electric current is accidentally dropped into the water, the circuit breaker stops the current passing to the electric device proper, so that an electric shock is preventable. Therefore, electric devices can be used near the water safely.

BRIEF DESCRIPTION OF THE DRAWINGS

Embodiments of the invention will now be described by way of example and with reference to the accompanying drawings, in which.

DETAILED DESCRIPTION OF PREFERRED EMBODIMENTS

Now, preferred embodiments of this invention will be described with reference the to accompanying drawings as follows.

These embodiments are described using a hair dryer, as an example, equiped with the circuit breaker of this invention.

(First Embodiment)

Figure 1A:
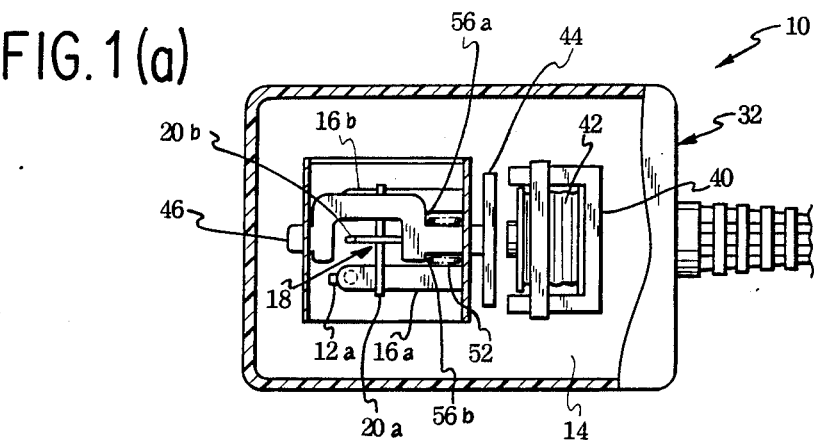
FIG. 1(a) shows a partially broken away top plan view of the plug of the first embodiment.
Figure 1B:
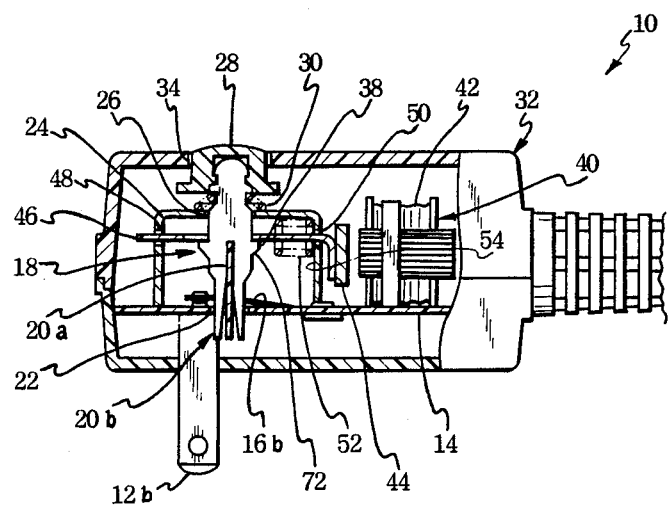
FIG. 1(b) shows a partially broken away front view of FIG. 1(a)
Figure 1C:
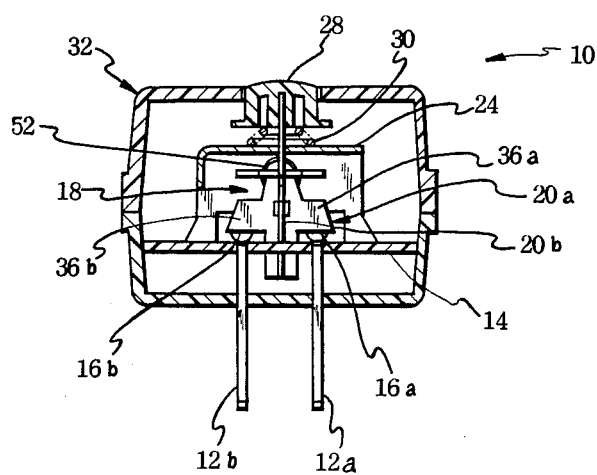
FIG. 1(c) shows a partially broken away side view of FIG. 1(a)

A plug 10 of a hair dryer (now shown) as an electric device proper is shown in FIG. 1: FIG. 1(a) is its top plan view, (b) is a front view and (c) is a side view.

Input terminals 12a and 12b will be inserted into an outlet (not shown) to supply electric power to the hair dryer.

Figure 2:
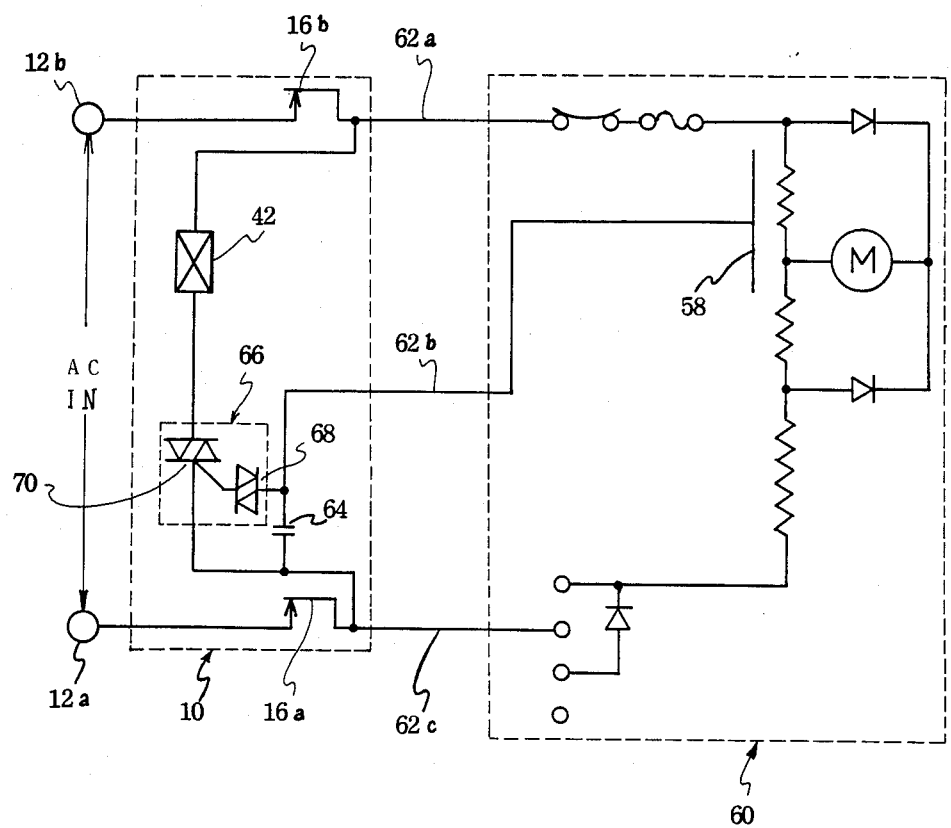
FIG. 2 shows a circuit diagram of the hair dryer of the first embodiment.

The electric circuit shown in FIG. 2 is printed partially on a circuit substrate 14.

Switching pieces 16a and 16b are made of elastic metal, and each of them is fixed its one end on the circuit substrate 14 and is connected to the electric circuit. The other ends of the switching pieces 16a and 16b are separeted from the input terminals 12a and 12b by their own elasticity when no forces act to cause the switching pieces 16a and 16b to stop supplying electric power to the electric circuit.

When forces act on the switching pieces 16a and 16b to contact the input terminals 12a and 12b, electric power can be supplied to the circuit of the hair dryer.

A pressing means 18 is comprised of pressing pieces 20a and 20b which are fixed each other perpendicularly. The lower end of the pressing means 18 is movably inserted into the through-hole 22 of the circuit substrate 14. The pressing piece 20b is passed through a through-hole 26 of a rod-frame 24 (described later), and the upper end thereof is connected to and fixed to a setting-button 28. The setting-button 28 can project from a through-hole 34. A coil spring 30 is provided between the bottom face of the setting button 28 and the rod-frame 24 to lift the setting button 28.

The pressing piece 20a has extended sections 36a and 36b. The switching pieces 16a and 16b can be pressed toward the input terminals 12a and 12b by the lower ends of the extended sections 36a and 36b of the pressing piece 20a. The pressing piece 20b has an engaging section 38 which can be engaged with an engaging means (described later).

A solenoid 40 having an electromagnetic coil 42 attracts a plate 44 when current passes through the electromagnetic coil 42. The engaging means 46 is fixed on the end face of the plate 44, opposite side to the solenoid 40. The engaging section 38 of the pressing piece 20b can engage the lower face of the engaging means 46 to keep the switching pieces 16a and 16b, which are pressed by the pressing piece 20a, contacting the input terminals 12a and 12b when the pressing means 18 is pressed in. The engaging means 46 is inserted movably into through-holes 48 and 50 bored in the two end faces of the rod-frame 46.

A coil spring 52 surrounds the pressing means 46 fixed to the plate 44, and one end of the spring contacts the inner wall of the rod-frame 24. The coil spring 52 energizes the engaging means 46, which is engaged with steps 56a and 56b, to the left (in the drawing) to urge the plate 44 away from the solenoid 40, so that the engaging means 46 engages the engaging section 38 of the pressing piece 20b.

Next, in the circuit diagram of FIG. 2, a terminal piece 58 is fixed to the inner part of the hair dryer proper 60, and insulated with respect to the hair dryer proper 60. The terminal piece 58 is connected to the plug 10 via cord 62b of an extension cord comprised of wires 62a, 62b and 62c.

Explanation of other parts of the hair dryer proper 60 is omitted since they are as same as in a conventional hair dryer.

A capacitor 64 is connected in series between the terminal piece 58 and the power source.

A gate 66 is comprised of a diac 68 and a triac 70 which is turned on or off by the breakover voltage of the diac 68. The diac 68 receives the charged voltage of the capacitor 64. When the charged voltage of the capacitor 64 exceeds the break-over voltage of the diac 68, the triac is turned on and the electric current passes through the electromagnetic coil 42 of the solenoid 40 serially connected to the triac 70.

Next, the action of the circuit breaker will be described.

Prior to using the hair dryer, the setting button 28 is pressed into the casing 32 against the elastic force of the coil spring 30. The pressing means 18 fixed to the setting button 28 pushes the engaging means 46 in the direction of the solenoid 40 against the elastic force of the coil spring 52 by the taper face 72 formed at lower part of the engaging section 38 of the pressing piece 20b. Upon riding over the taper face 72 of the engaging section 38, the engaging means 46 is forced to move to the left again by the elastic force of the coil spring 52. Then the engaging means 46 engages the engaging section of the pressing piece 20b, so that the pressing means 18 is kept in a pressed in state. Simulteneously, the pressing piece 20a of the pressing means 18 keeps the switching pieces 16a and 16b contacting the input terminals 12a and 12b by the extended sections 36a and 36b of the pressing piece 20a. The electric circuit is closed by this contact so that the electric power is supplied to the hair dryer proper 60 upon inserting the input terminals 12a and 12b into the outlet (now shown). The electric current passes to the hair dryer proper 60 via the extension cord 62a and 62b. In this state, no current is passed through the electromagnetic coil 42 of the solenoid 42.

If accidently the hair dryer proper 60 has been dropped into water, leakage current flows to the terminal piece 58 via the water. The leakage current picked up by the terminal piece 58 charges the capacitor 64 via the extension cord 62b. When the charged voltage of the capacitor 64 has risen over the breakdown voltage of the diac 68 of the gate 66, the gate signal flows to the gate terminal of the triac 70 from the diac 68 so that the triac 70 turns on. Upon the turning on of the triac 70, the electric current from the power source passes through the electromagnetic coil 42 of the solenoid 40, and the electromagnetic coil 42 is excited.

Upon magnetization of the electomagnetic coil 42, the solenoid 40 attracts the plate 44 against the elastic force of the coil spring 52. When the plate 44 is attracted to the solenoid 40, the engaging means 46 also moves to the right. Then engaging means 46 is released from the engaging section 38 of the pressing piece 20b, and the pressing means 18 and the setting button 28 are forced up together by the elastic force of the coil spring 30. At that time, the pressing of the switching pieces 16a and 16b by the extended sections 36a and 36b of the pressing piece 20a is released and the switching pieces 16a and 16b separate from the input terminals 12a and 12b by own elasticity. The electric circuit has now been opened and the power supplied is stopped at the input terminals 12a and 12b so that no current flows to the hair dryer proper 60.

Therefore, there is no danger of an electric shock, even when touching the hair dryer proper 60 in the water.

(Second Embodiment)

Figure 3:
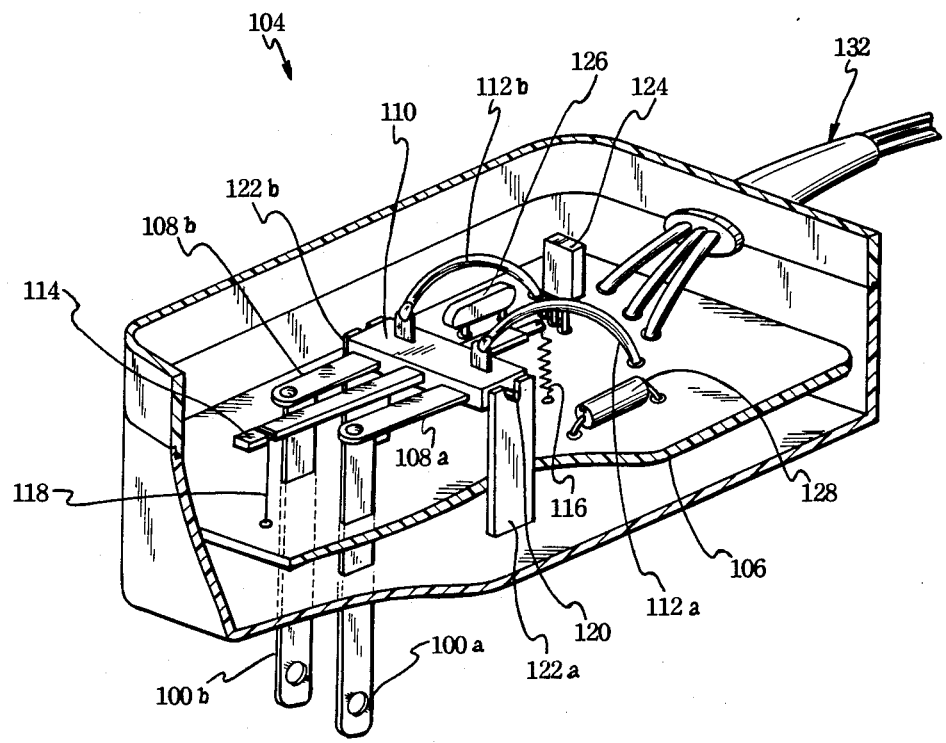
FIG. 3 shows a partially broken away perspective view of the plug of the second embodiment.

First, the structure is described with reference to FIG. 3.

Input terminals 100a and 100b of a plug 104 are inserted into an outlet (not shown) to supply the electric power to a hair dryer proper 102 from the commercial power source.

An electric circuit (described later) is printed on a substrate 106.

Switching pieces 108a and 108b are made of metal, they extend into a rotator 110 and one end of each piece projects therefrom. The projecting ends of the switching pieces 108a and 108b are connected to the electric circuit on the substrate 106 by lead wires 112a and 112b. The other ends of the switching pieces 108a and 108b are free, and can contact with inner ends of the input terminals 100a and 100b.

An arm 114 is made of metal, and pierces the rotator 110. One end of the arm 114 is biased in the direction of the substrate 106 and is connected to the electric circuit thereon by a spring 116. The other end of the arm 114 is connected to the electric circuit by a fuse 118. The fuse 118 connects the arm 114 to the electric circuit on the substrate 106, and prevents the rotator 110 from rotation against the elastic force of the spring 116 so that the fuse 118 keeps the switching pieces 108a and 108b contacting the input terminals 100a and 100b.

Shafts 120 (one of which is not shown) are provided on both end faces of the rotator 110.

The shafts 120 are rotatably supported by supporting pieces 122a and 122b, so that the rotator 110 can be pivoted on the shafts 120.

The triac 124 is connected in parallel with the power source, and its starting voltage is the same as the full-charged voltage of the capacitor 126. The triac 124 is provided with a protective resistance 128.

Figure 4:
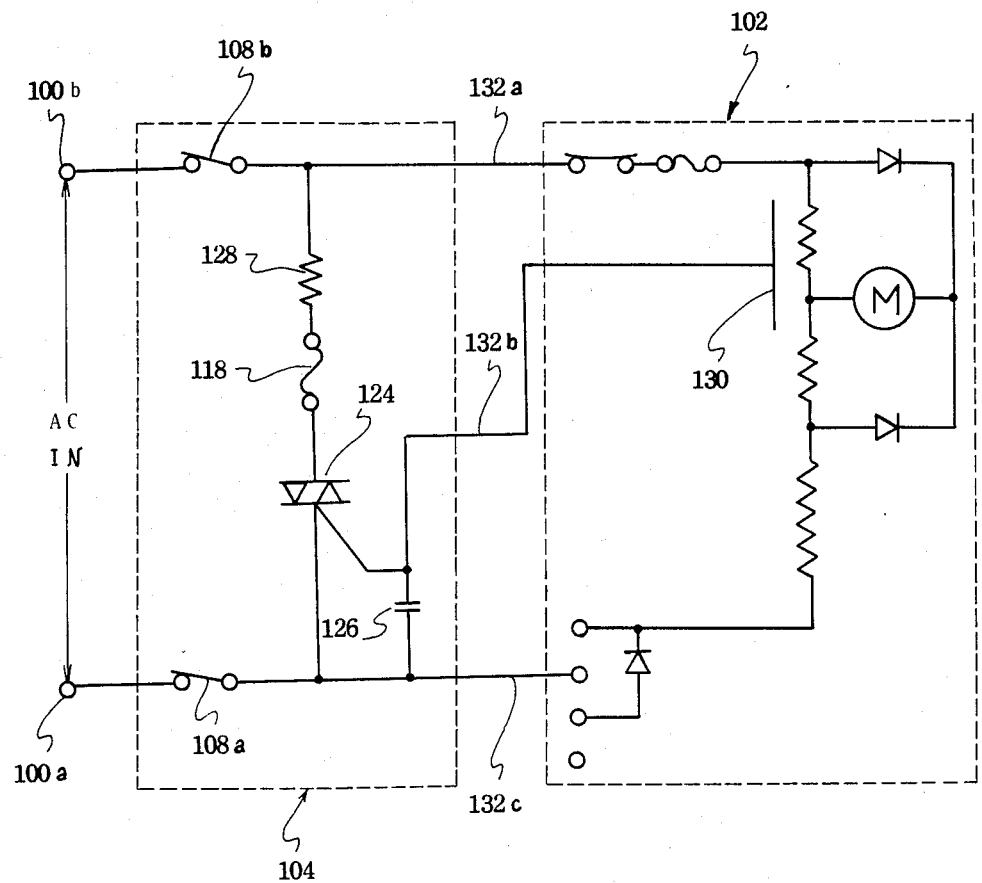
FIG. 4 shows a circuit diagram of the hair dryer of the second embodiment.

Next, in the circuit diagram of FIG. 4, a terminal piece 130 is fixed in the inner part of the hair dryer proper 102, and is insulated from the hair dryer proper 102. The terminal piece 130 is connected to the input terminal 100a by a three-wire cord 132 via the capacitor 126.

Next, the action will be described with reference to FIGS. 3 and 4. The state shown in FIGS. 3 and 4 is the normal operation state of the hair dryer. The switching pieces 108a and 108b contact the input terminals 100a and 100b to close the electric circuit. In the state, upon supplying the electric power, the hair dryer can be used.

In case that the hair dryer proper 102 using is accidentally dropped into the water, the leaked current flows to the terminal piece 130 via water.

The leakage current picked up by the terminal piece 130 flows to the capacitor 126 via the extension cord 132b then charges the capacitor 126. When the charged voltage of the capacitor 126 has reached to the full-charged voltage, the starting voltage is inputted to the gate terminal of the triac 124, then the triac 124 turns on. Upon turning the triac 124 on, the electric current passes the fuse 118 and generates heat, then the fuse 118 melts. When the fuse 118 has melted, the means for keeping the rotator 110 against the elastic force of the spring 116 is removed. The rotator 110 is then pivoted on the shafts 120 in the clockwise direction by the spring 116, then the switching pieces 108a and 108b separate from the input terminals 100a and 100b. Upon separation, supplying the electric power to the electric circuit and of course to the hair dryer proper 102 is stopped.

In this embodiment, connecting the arm 114 to the electric circuit by additional lead wire in place of the spring 116, and using an S.C.R. (Silicon Controlled Rectifier) as a gate in place of the triac 124 are satisfactory alternatives.

(Third Embodiment)

The third embodiment will be described with reference to FIG. 5. The electric circuit of this embodiment is the same as the circuit of the first embodiment, so a circuit diagram is omitted.

Figure 5:
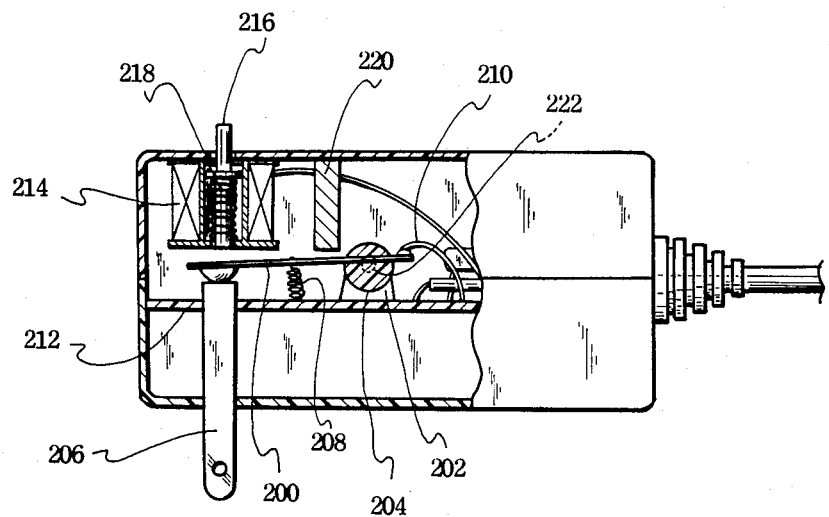
FIG. 5 shows a partially broken away front view of the plug of the third embodiment.

In FIG. 5, switching pieces 200 (only one of which is shown) are fixed to a rotator 204 whose two ends are supported by supporting pieces 202 one end of each piece 200 can contact a separate one of the input terminals 206. To keep the switching pieces 200 contacting the input terminals 206, coil springs 208 bias the switching pieces 200 to turn on the rotator 204 in the counter clockwise direction. The other ends of the switching pieces 200 are connected to the electric circuit printed on a substrate 212 by a lead wire 210.

Note that, the switching pieces 200, the input terminals 206, the supporting pieces 202, and the coil springs 208 are, of course, pairs (one of which is not shown).

An electro-magnet 214 corresponding to the solenoid 40 of the first embodiment serves as a drive. A reset-lever 216 is inserted into the center of the electro-magnet 214, and is always biased upward by a spring 218.

A magnet 220 keeps the the switching pieces 200 separated from the input terminals 206.

The action of the circuit breaker having the above stated structure is similar to the first embodiment.

Namely, when the hair dryer proper (not shown) has been immersed in water, a gate is opened by the leakage current, then the electric current from the power source passes the electro-magnet 214. Then the electro-magnet 214 attracts the switching pieces 200 against the elastic force of the coil springs 208.

Upon attracting the switching pieces 200, the rotator 204 pivots on the shafts 222 in the clockwise direction, then the switching pieces 200 separate from the input terminals 206 so that the supply of electric power to the hair dryer proper is stopped. Simultaneously, the switching pieces 200 attracted by the electro-magnet 214 are attracted by the magnet 220. Therefore, even if the electro magnet 214 loses magnetic force, the switching pieces 200 is kept separated from the imput terminals by the magnet 220.

Even if we touch the hair dryer proper in the water, the electric shock can be preventable.

For reuse, the switching pieces 200 can be contacted the input terminals 206 by depressing the reset-lever 216. Upon depressing the reset-lever 216, the lower end of the lever 216 depresses the switching pieces 200, then the switching pieces 200 are separated from the magnet 220 and are pulled by the coil spring 208 to contact the input terminals 206.

The invention being thus described, it will be obvious that the same may be varied in many ways. Such variations are not to be regarded as a departure from the spirit and scope of the invention, and all such modification as would be obvious to one skilled in the art are intended to be included within the scope of following claims.

What is claimed is:

1. A circuit breaker arrangement for connection between a power source and an electric device to prevent a user of the electric device from receiving an electric shock upon immersion of the electric device in water, comprising, an electric circuit including power input terminals and switching elements connected to apply electric power to the electric device from the power input terminals;

means for biasing said switching elements in a direction to interrupt the electric circuit connection between the power input terminals and the electric circuit;

a series circuit of a meltable material and a gate connected between said power input terminals, said meltable material being mounted to hold said switching elements in a position to close the electric circuit connection between said power input terminals and said electric device, said meltable material holding said switching elements against the force of said biasing means, said meltable material having a first end connected to the electric circuit and a second end connected to one end of an arm of a rotatable element, said rotatable element having another end connected to the electric circuit by said biasing means, whereby electric power for said electric device is interrupted by melting of said meltable material when current passes therethrough; and a terminal piece in said electric device and connected to the electric circuit by a conductor, said terminal piece being connected to trigger said gate to a conductive state in response to the receipt of leakage current thereto received upon immersion of the electric device in water.

2. A circuit breaker according to claim 1, wherein said meltable material is a fuse.

3. A circuit breaker according to claim 1, wherein said means for biasing is a coil spring.

* * * * *